United States Patent [19]

Ney

[11] 4,047,756
[45] Sept. 13, 1977

[54] CHAIR CONSTRUCTION AND METHOD OF ASSEMBLING THE SAME

[75] Inventor: David Marshall Ney, St. Ives, Australia

[73] Assignee: Yoshida Kogyo Kabushiki Kaisha, Japan

[21] Appl. No.: 618,627

[22] Filed: Oct. 1, 1975

[30] Foreign Application Priority Data

Oct. 18, 1974   Japan .................................. 49-120632
Oct. 18, 1974   Japan .................................. 49-120633

[51] Int. Cl.² .......................................... A47C 27/00
[52] U.S. Cl. ................................. 297/219; 297/225; 297/228
[58] Field of Search ...................... 297/219, 225, 228; 24/205.11 F

[56] References Cited

U.S. PATENT DOCUMENTS

| | | | |
|---|---|---|---|
| 1,933,372 | 10/1933 | Fisher | 297/228 X |
| 2,286,171 | 6/1942 | Krasnov et al. | 297/228 X |
| 2,349,193 | 5/1944 | Pass | 297/225 |
| 2,400,731 | 5/1946 | Armstrong | 5/354 |
| 2,575,548 | 11/1951 | Carter et al. | 297/219 |
| 2,579,276 | 12/1951 | Schworm, Jr. | 24/205 R |
| 2,623,214 | 12/1952 | Yaffe | 24/205 R |
| 2,895,542 | 7/1959 | Schutte | 297/219 |
| 3,226,157 | 12/1965 | Reinfeldt | 297/219 |
| 3,555,627 | 1/1971 | Howell | 24/205.11 F |

*Primary Examiner*—Roy D. Frazier
*Assistant Examiner*—Peter A. Aschenbrenner
*Attorney, Agent, or Firm*—Bucknam and Archer

[57] ABSTRACT

A chair is provided with a covering sheet, which sheet comprises a front fly and a back fly interconnected by a slide fastener chain. An end stop is applied to a terminal end of the fastener chain after the latter is closed and either before or after the slider is removed.

3 Claims, 10 Drawing Figures

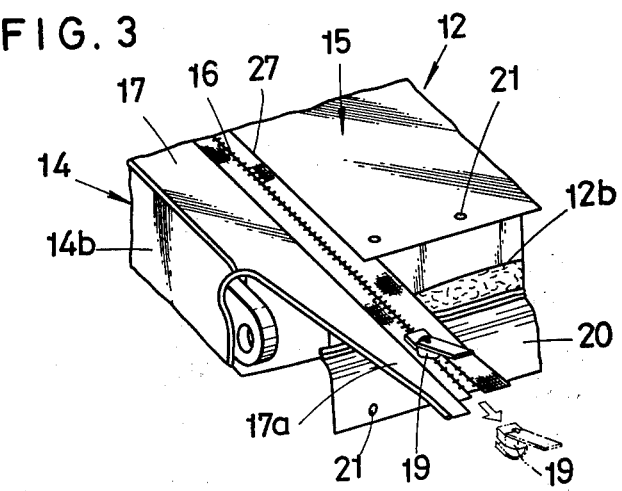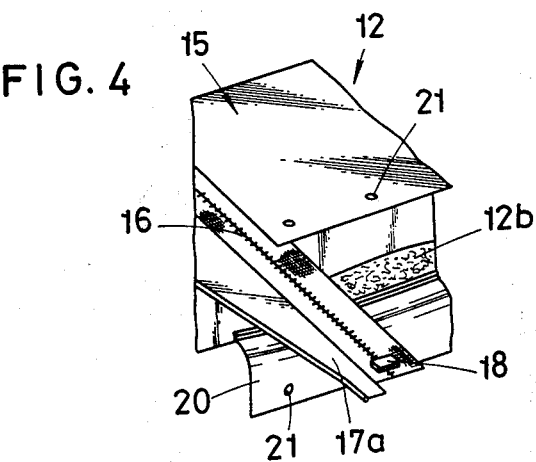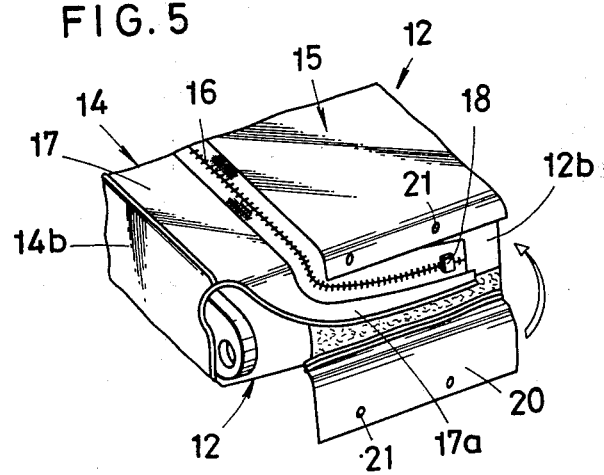

CHAIR CONSTRUCTION AND METHOD OF ASSEMBLING THE SAME

BACKGROUND OF THE INVENTION

This invention relates to chairs suitable for use in automobiles, theaters and the like.

It has been desired to manufacture chairs of the class described which are neatly and sightly assembled with the covering sheets kept taut uniformly over the seat and back-rest portions. The conventional method of covering these chair portions was to fit prefabricated sacks snugly into position over the respective chair portions. However, this operation by hand was time-consuming and tedious because such sacks were closely measured to match the dimensions of the chair with a view to producing a taut and smooth surface and hence were not too easy to put in place on the chair. Advanced methods may be considered for attaching the covering sheet to the chair with the use of a slide fastener. However, such slide fasteners have determinate lengths so that it is difficult to apply them to chairs of different sizes. What is more, complete slide fasteners are assembled with such sliders and end stops that would cause the sheet fabric to swell unsightly and become susceptible to damage.

SUMMARY OF THE INVENTION

With the foregoing difficulties of the conventional chairs taken in view, it is the primary object of the present invention to provide an improved chair construction which in its assembled disposition presents a neat, taut and smooth surface appearance.

It is another object of the invention to provide a method of assembling chairs which permits the covering sheets to be fitted securely over the chair where desired with utmost ease and at a high rate of speed, yet with the surfaces of the sheets kept taut and sightly.

Briefly stated, there is provided a chair having a covering sheet, which sheet comprises a front fly, a back fly, a longitudinal marginal strip integral with said front fly and defining with said back fly an opening, and a slide fastener chain extending over and along said opening and adapted to close said opening, said fastener chain having an end stop secured to its terminal end in the absence of a slider or similar fastener closing member.

The invention will be better understood from the following description taken in connection with the accompanying drawings illustrating some preferred embodiments which the invention may assume in practice. Like reference numerals denote like or corresponding parts throughout the several views.

BRIEF DESCRIPTION OF THE DRAWINGS

FIG. 3 is a fragmentary perspective view of the back-rest having its covering sheet just closed in place;

FIG. 4 is a view similar to FIG. 3 but showing an end stop attached to an end of the fastener chain;

FIG. 5 is a fragmentary perspective view of the back-rest of the chair, showing an end portion of the fastener chain attached to a bottom end of the back-rest;

DETAILED DESCRIPTION OF THE PREFERRED EMBODIMENTS

Figure 1:
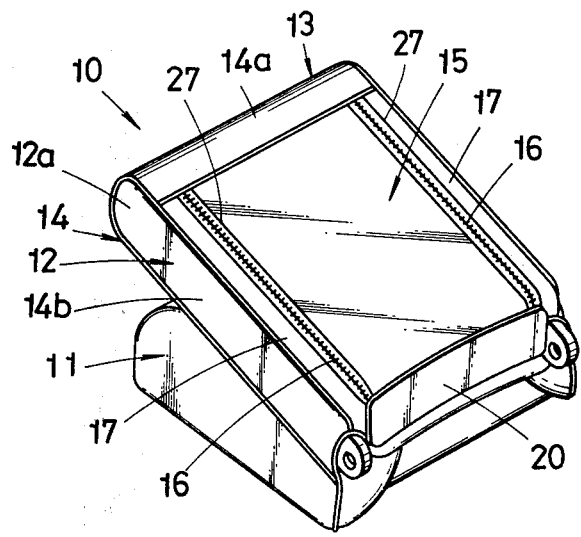
FIG. 1 is a perspective view of a chair provided in accordance with the invention.
Figure 6:
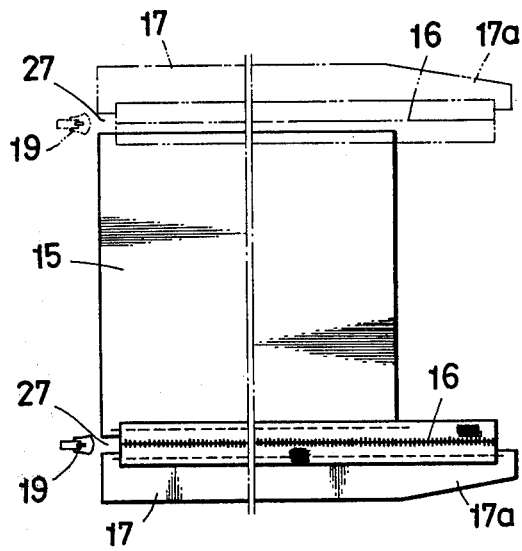
FIG. 6 is a explanatory plan view showing how the covering sheet is attached to the back-rest of the chair.

Referring now to the drawings and FIG. 1, there is shown a chair 10 provided in accordance with a preferred embodiment of the invention. The chair 10 comprises a seat portion 11 and a back-rest portion 12 hinged thereto, both being covered with a suitable sheet material such as a leather, cloth or the like. The covering sheet 13 according to a first embodiment shown in FIGS. 1 through 6, inclusive, essentially comprises a front fly 14 and a back fly 15, both flies being separably joined by a pair of slide fastener chains 16 extending near and along opposite longitudinal edges of the reverse side of the back-rest 12. The front fly 14 includes integrally formed top end strip 14a folded back around a top end 12a of the back-rest and side strips 14b integral with or otherwise joined to the front fly 14. The covering sheet 13 further includes longitudinal marginal strips 17 integral with or joined to the front fly 14 and extending along respective longitudinal edges of the back-rest 12. The marginal strips 17 each define with the back fly 15 and opening 27 along which the slide fastener chain 16 is attached, as shown in FIG. 6, to separably interconnect the front fly 14 with the back fly 15. As better shown in FIGS. 3 and 4, the marginal strips 17 each have a tail 17a extending together with the slide fastener chain 16 beyond a bottom end 12b of the back-rest 12.

There is provided a staple-like end stop 18 which is applied to a terminal end of the slide fastener chain 16 either prior or subsequent to the removal of a slider or similar fastener closing member 19 in a manner hereafter described. After the end stop 18 is thus attached to the fastener chain 16, the tail 17a is bent inwardly along the bottom end 12b of the back-rest 12 as shown in FIG. 5.

Figure 10:
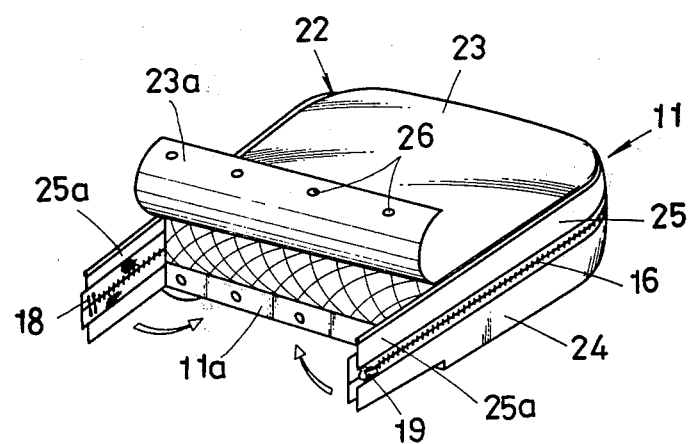
FIG. 10 is a perspective view of a seat of a chair to which the principles of the invention are applied.

Designated at 20 is a flapper secured at one longitudinal edge to the bottom end 12b of the back-rest 12 and separably connected at the other edge of the back fly 15 by means of for example snap buttons 21. The flapper 20 is thus adapted to enclose the tail 17a and the end portion of the fastener chain 16 that have been bent over the bottom end 12b of the back-rest 12. Referring now to FIG. 10, there is shown a covering sheet 22 for the seat 11 of the chair 10, which sheet includes a front fly 23, a back fly 24 and a peripheral strip 25 interconnecting both flies through the medium of a slide fastener chain 16 extending all way around and attached to the peripheral strip 25. The peripheral strip 25 has both ends extended together with the fastener 16 beyond the rear end 11a of the seat 11, each of such extensions or tails 25a being bent inwardly over the rear end 11a as indicated by the arrows in FIG. 10. The front fly 23 also has an extension 23a which is adapted to envelop the tail 25a and the end portion of the fastener 16 that have been bent in place, for which purpose the extension 23a is provided with snap buttons as at 26. The chain thus constructed is advantageous in that the fastener chain 16 is prevented by the end stop 18 from accidental opening while in use and that the absence of the slider 19 when the covering sheet 13 is mounted in place serves to keep the sheet 13 neatly taut.

Figure 2:
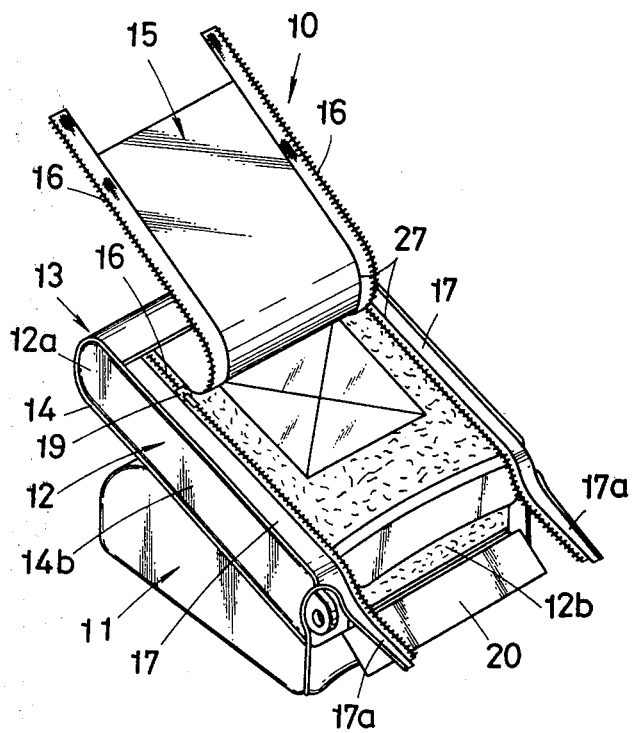
FIG. 2 is a perspective view of the same utilized to explain how the covering sheet is closed upon the back-rest.
Figure 7:
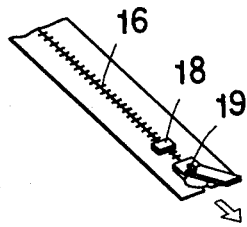
FIG. 7 is a perspective view of a slide fastener chain showing an end stop applied prior to the removal of a slider.

A preferred procedure of applying the covering sheet 13 to the chair 10, particularly to the back-rest 12 thereof will follow. To begin with, both of the fastener chain 16 are opened as by moving the sliders 19 upwardly toward the top end 12a of the back-rest 12, thereby separating the front fly 14 from the back fly 15. The covering sheet 13 in such disposition as shown in FIG. 2 is mounted in place over the back-rest 12. Subsequently, the sliders 19 are moved downwardly to close the respective fastener chains 16 as shown in FIG. 3. The end stop 18 is then applied to a terminal end of each fastener chain 16 as shown in FIG. 4. This can be done either before or after the slider 19 is removed. Preferably however, the end stop 18 should be applied prior to removal of the slider 19 in a manner illustrated in FIG. 7 with a view to preventing accidental separation of the opposed stringers of the fastener chain 16. The tail 17a of each marginal strip 17 is now bent together with the end portion of the fastener chain 16 over the bottom end 12b of the back-rest 12 and secured in place by the flapper 20. A similar procedure applies to the attachment of the covering sheet 22 to the seat 11 of the chair 10. Thus, the operation of attaching the covering sheet 13 to the respective portions of the chain 10 is extremely simple and easy since the sheet 13 in the form of a bag can be kept partly open along the edges closed by the fastener chain and can therefore be secured to the chain with uniform tension and without being locally distorted.

Figure 8:
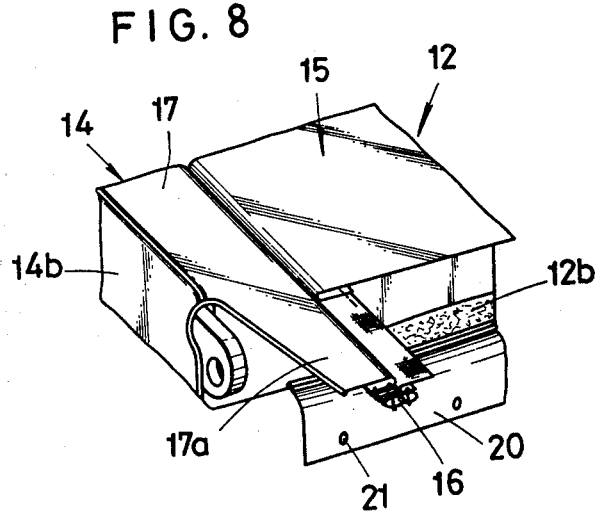
FIG. 8 is a fragmentary perspective view of the back-rest to the chair to which a concealed type of fastener chain is applied to attach the covering sheet.
Figure 9:
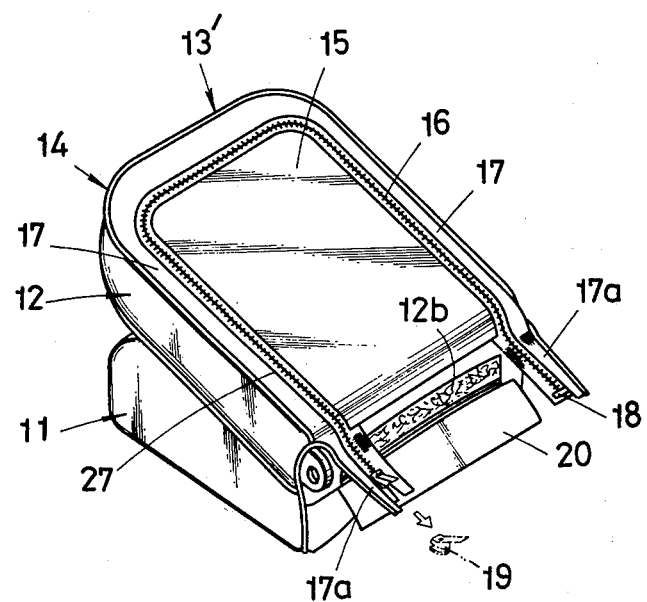
FIG. 9 is a perspective view of a modified form of chair provided in accordance with the invention in which the covering sheet is attached to the back-rest by means of a single piece of slide fastener chain.

While the invention has been described in connection to certain preferred embodiments, it is to be understood that various changes and modifications may be made therein without departing from the scope of the appended claims. As for an example, a single chain of slide fastener may be used as illustrated in FIG. 9 instead of using two separate fastener chains, provided there is always involved the step of removing the slider or similar fastener closing member upon closure of the fastener chain. As for another example, there may be used a concealed type of slide fastener chain as shown in FIG. 8 whereby the fastener components are concealed fron external view.

What is claimed is:

1. In a chair construction having a seat with a top, a bottom, a front end, a rear end and a pair of opposing sides; and a back rest with a front, a rear, a top end, a bottom end and a pair of opposing sides, the improvement which comprises a covering of sheet material extending over the front, top end and opposing sides of said back rest, said covering having elongated marginal strip areas of sheet material extending partially over the rear of said back rest and defining an opening accommodating the fitting of said covering upon the back rest; a flap of sheet material extending in adjoining relation to said strip areas and over the rear of said back rest to cover said opening, and at least one slide fastener connected to adjoining edge portions of said strip areas and flap to secure same together closing said opening, said strip areas, flap and slide fastener defining a pair of tail pieces extending beyond the rear of the back rest and foldable against the bottom end thereof, each tail piece bearing a terminal end of said slide fastener; and a piece of sheet material secured against the bottom end of the back rest in overlying relation to said tail pieces.

2. The improvement according to claim 1 including a covering of sheet material extending over the top, bottom front end and opposing sides of said seat, said covering including pieces of sheet material connected together by a slide fastener, the terminal end portions of said slide fastener and portions of said covering adjoining said terminal end portions defining tail pieces foldable against the rear end of said seat, said covering having a flap secured against the rear end of said seat in overlying relation to said tail pieces.

3. In a chair construction having an upholstered member with a front, back and plurality of sides extending between said front and back, the improvement which comprises a covering of sheet material extending over the front, back and all except one of said sides, said covering including pieces of sheet material connected together by a slide fastener, and a flap, a terminal end portion of said slide fastener and portions of said covering adjoining said terminal end portion of the slide fastener defining a tail piece folded against said excepted one side, said flap being secured against said one side in overlying relation to said tail piece.

* * * * *